(12) United States Patent
Powell

(10) Patent No.: US 8,665,902 B2
(45) Date of Patent: Mar. 4, 2014

(54) METHOD AND SYSTEM FOR REDUCING TRANSCEIVER POWER VIA A VARIABLE SYMBOL RATE

(75) Inventor: Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 285 days.

(21) Appl. No.: 11/859,459

(22) Filed: Sep. 21, 2007

(65) Prior Publication Data

US 2008/0225879 A1 Sep. 18, 2008

Related U.S. Application Data

(60) Provisional application No. 60/894,240, filed on Mar. 12, 2007, provisional application No. 60/917,870, filed on May 14, 2007.

(51) Int. Cl.
*H04J 3/22* (2006.01)

(52) U.S. Cl.
USPC ............ 370/468; 370/466; 370/469; 370/477

(58) Field of Classification Search
USPC ......... 370/437, 443, 445, 468, 252, 338, 401, 370/509, 466, 469, 477, 535; 375/240, 375/240.27, 140, 343; 455/574; 714/704; 713/300, 600; 709/233; 710/29
See application file for complete search history.

(56) References Cited

U.S. PATENT DOCUMENTS

| | | | |
|---|---|---|---|
| 6,192,422 B1 * | 2/2001 | Daines et al. | 710/29 |
| 6,266,344 B1 * | 7/2001 | Fujimori et al. | 370/468 |
| 6,442,174 B1 | 8/2002 | Lin | |
| 6,529,957 B1 * | 3/2003 | Joergensen | 709/233 |
| 6,538,994 B1 * | 3/2003 | Horspool et al. | 370/230 |

(Continued)

FOREIGN PATENT DOCUMENTS

| | | |
|---|---|---|
| EP | 1 473 870 | 11/2004 |
| EP | 1484876 | 12/2004 |

(Continued)

OTHER PUBLICATIONS

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

(Continued)

*Primary Examiner* — Brian D Nguyen
*Assistant Examiner* — Toan Nguyen
(74) *Attorney, Agent, or Firm* — Farjami & Farjami LLP

(57) ABSTRACT

Aspects of a method and system for reducing transceiver power via a variable symbol rate are provided. In this regard, an Ethernet transmitter may be enabled to transmit data at a variable symbol rate, wherein the symbol rate is determined based on a state of a link coupled to said Ethernet transmitter and/or resources available to said Ethernet transmitter. In this regard, link state may comprise one or more of, for example, available bandwidth, bit error rate, packet error rate, and link utilization; and resources may comprise one or more of, for example, power, buffer space, and processor time. Accordingly one or more threshold for link state and/or resources may be determined and the symbol rate may be adjusted when those thresholds are exceeded. Aspects of the invention may enable defining and/or transmitting unique symbols to identify possible symbol rates and/or a change in symbol rate.

21 Claims, 7 Drawing Sheets

(56) References Cited

U.S. PATENT DOCUMENTS

| | | | |
|---|---|---|---|
| 6,587,473 B2* | 7/2003 | Terry et al. | 370/445 |
| 6,728,216 B1* | 4/2004 | Sterner | 370/252 |
| 6,795,450 B1 | 9/2004 | Mills et al. | |
| 6,856,597 B1 | 2/2005 | Scott | |
| 6,952,399 B1* | 10/2005 | Bayerl et al. | 370/229 |
| 7,003,331 B2* | 2/2006 | Cromer et al. | 455/574 |
| 7,050,517 B1 | 5/2006 | Sallaway | |
| 7,106,715 B1* | 9/2006 | Kelton et al. | 370/338 |
| 7,116,682 B1* | 10/2006 | Waclawsky et al. | 370/468 |
| 7,308,058 B2 | 12/2007 | Zerbe | |
| 7,315,967 B2* | 1/2008 | Azenko et al. | 714/704 |
| 7,555,016 B2* | 6/2009 | Page | 370/509 |
| 7,835,374 B2 | 11/2010 | Diab | |
| 8,179,910 B2 | 5/2012 | Diab | |
| 8,352,569 B2 | 1/2013 | Hare | |
| 2002/0019954 A1* | 2/2002 | Tran | 713/600 |
| 2002/0131426 A1* | 9/2002 | Amit et al. | 370/401 |
| 2002/0172274 A1* | 11/2002 | Carlson | 375/222 |
| 2003/0152112 A1* | 8/2003 | Almog et al. | 370/535 |
| 2004/0003296 A1* | 1/2004 | Robert et al. | 713/300 |
| 2006/0034295 A1 | 2/2006 | Cherukuri et al. | |
| 2007/0014575 A1 | 1/2007 | Kramer | |
| 2007/0192505 A1 | 8/2007 | Dalmia | |
| 2007/0206709 A1* | 9/2007 | Khermosh et al. | 375/343 |
| 2007/0280239 A1 | 12/2007 | Lund | |
| 2008/0069014 A1 | 3/2008 | Powell et al. | |
| 2008/0159304 A1 | 7/2008 | Ozugur | |
| 2008/0187028 A1* | 8/2008 | Lida | 375/140 |
| 2008/0225841 A1 | 9/2008 | Conway et al. | |
| 2009/0180529 A1 | 7/2009 | Agazzi | |

FOREIGN PATENT DOCUMENTS

| | | |
|---|---|---|
| EP | 1 494 407 | 1/2005 |
| GB | 2337672 | 11/1999 |
| WO | WO 00/31923 | 6/2000 |

OTHER PUBLICATIONS

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

\* cited by examiner

METHOD AND SYSTEM FOR REDUCING TRANSCEIVER POWER VIA A VARIABLE SYMBOL RATE

CROSS-REFERENCE TO RELATED APPLICATIONS/INCORPORATION BY REFERENCE

This patent application makes reference to, claims priority to and claims benefit from U.S. Provisional Patent Application Ser. No. 60,894,240 filed on Mar. 12, 2007.

This patent application also makes reference to, claims priority to and claims benefit from U.S. Provisional Patent Application Ser. No. 60,917,870 filed on May 14, 2007.

This application also makes reference to:
U.S. patent application Ser. No. 11/859,429 filed on Sep. 21, 2007; now U.S. Pat. No. 8,218,567;
U.S. patent application Ser. No. 11/859,482 filed on Sep. 21, 2007; now U.S. Pat. No. 8,270,434; and
U.S. patent application Ser. No. 11/859,385 filed on Sep. 21, 2007 now U.S. Pat. No. 7,920,597.

Each of the above stated applications is hereby incorporated herein by reference in its entirety.

FIELD OF THE INVENTION

Certain embodiments of the invention relate to networking. More specifically, certain embodiments of the invention relate to a method and system for reducing transceiver power via a variable symbol rate.

BACKGROUND OF THE INVENTION

With the world becoming increasingly dependant on electronics and communication networks, the number of devices connected to data networks is rapidly increasing and higher data rates are being demanded. In this regard, the increased demand for multimedia content, and High Definition multimedia content in particular, is a major force driving the demand for higher speed networks. Accordingly, there is a growing need for new transmission technologies enabling higher transmission rates. Moreover, cost considerations are driving a demand to increase the capabilities of existing copper cabling infrastructures. Accordingly, there has been, and continues to be, great amounts of effort spent on increasing the capabilities of Ethernet networks; since Ethernet is by far the predominant networking technology. In this regard, standards such as 1 GBASE-T for 1 Gbps data rates over twisted pair, and 10 GBASE-T for 10 Gbps data rates over twisted pair cabling have been developed and are seeing increased deployment in a wide variety of applications. Additionally, future standards currently being developed seek to push data rates for Ethernet network even higher. However, with the increase in data rates more sophisticated signal processing is required. Additionally, higher data rates and more advanced circuitry may increase power consumption in networks and networking devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reducing transceiver power via a variable symbol rate, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for reducing transceiver power via a variable symbol rate. In this regard, an Ethernet transmitter may be enabled to transmit data at a variable symbol rate, wherein the symbol rate is determined based on a state of a link coupled to said Ethernet transmitter and/or resources available to said Ethernet transmitter. In this regard, link state may comprise one or more of, for example, available bandwidth, bit error rate, packet error rate, and link utilization; and resources may comprise one or more of, for example, power, buffer space, and processor time. Accordingly one or more threshold for link state and/or resources may be determined and the symbol rate may be adjusted when those thresholds are exceeded. Aspects of the invention may enable defining and/or transmitting unique symbols to identify possible symbol rates and/or a change in symbol rate.

Figure 1:
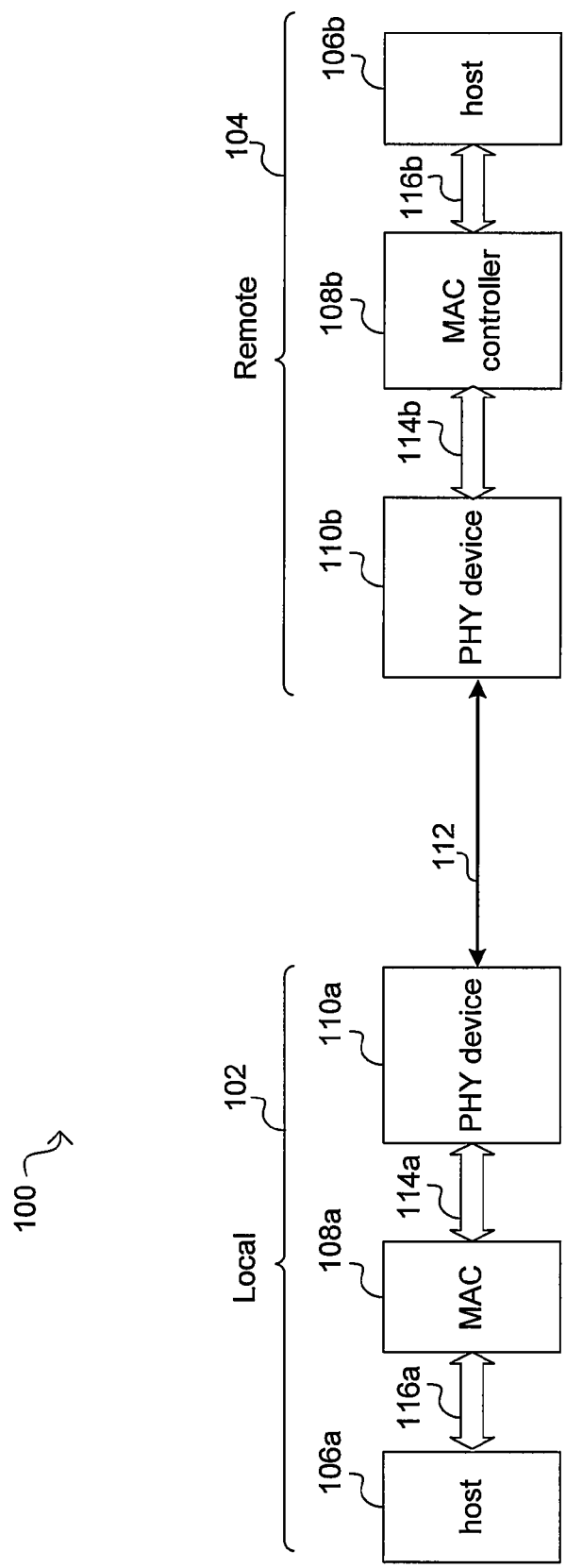
FIG. 1 is a block diagram illustrating an Ethernet connection between a local link partner and a remote link partner, in connection with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 communicate via a cable 112. The cable 112 may comprise up to four or more links, each of which may, for example, comprise an unshielded twisted pair (UTP). The local link partner 102 and the remote link partner 104 may communicate via two or more links comprising the cable 112. For example, Ethernet over twisted pair standards 10 Base-T and 100 Base-TX may utilize two pairs of UTP while Ethernet over twisted pair standards 1000 Base-T and 10 GBase-T may utilize four pairs of UTP.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the link partners 102 and 104 may be enabled to utilize AudioNideo Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY device s 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode. In this regard, the PHY devices 110a and 110b may be enabled to select the fastest configuration supported by both. In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data.

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer adds its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data at a fixed symbol rate which may result in network links being underutilized for significant portions of time. In this manner, conventional PHY devices may continuously transmit IDLE symbols between packets of actual data. Consequently, conventional PHY devices may use a significant amount of power transmitting at a higher data rate than necessary. Accordingly, aspects of the invention may enable reducing power consumption by transmitting data at a low(er) symbol rate. Additionally, aspects of the invention may enable varying a symbol rate based on a state of a link such as a link comprising the cable 112. In this regard, the state of a link may be characterized by link utilization, bit error rates and/or packet error rates. Additionally, aspects of the invention may enable varying a symbol rate based on availability of resources (e.g. power, processor time, buffers, etc.).

In an exemplary operation, the link partner 102 may initially transmit data to the link partner 104 at a first, high(er) data rate and may determine that the first, high(er) data rate is unnecessary or undesirable. For example, error rates and/or power consumption may be too high due to the high(er) data rate; or link utilization may be too low, resulting in IDLE signals being transmitted for significant periods of time. Accordingly, the link partner 102 may reduce the symbol rate at which it transmits data onto the cable 112. In this regard, the link partner 102 may need a way to coordinate a new symbol rate with the link partner 104 in order to prevent receive errors in the link partner 104. Accordingly, aspects of the invention may enable the link partner 102 to transmit one or more symbols to indicate a forthcoming change in symbol rate. In this manner, one or more unique symbols may be defined to identify each of a plurality of possible symbol rates. Accordingly, prior to changing to a new symbol rate, the link partner 102 may transmit one or more symbols which identify a change in symbol rate. Moreover, the symbols which identify symbol rates and or changes in symbol rates may be in addition to, in place of, or a modified form of conventional IDLE symbols. In various embodiments of the invention, the new symbol rate may be negotiated in a manner similar to auto-negotiation.

Figure 2:
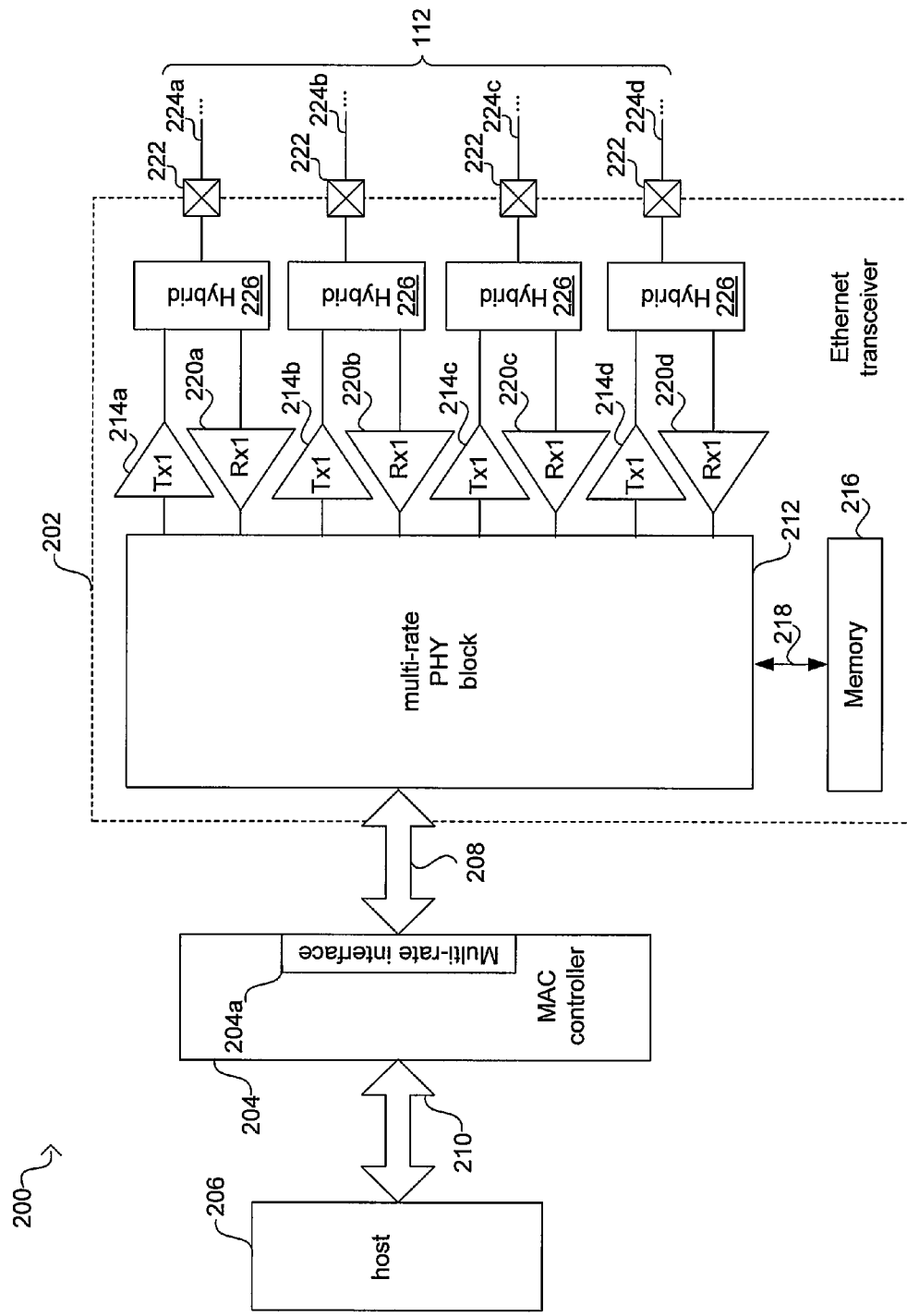
FIG. 2 is a block diagram illustrating an exemplary Ethernet over twisted pair PHY device architecture comprising a multi-rate physical block, in accordance with an embodiment of the invention.

FIG. 2 is a block diagram illustrating an exemplary Ethernet over twisted pair PHY device architecture comprising a multi-rate physical block, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a multi-rate physical layer block 212, one or more transmitters 214, one or more receivers 220, a memory 216, a memory interface 218, and one or more input/output interfaces 222.

The PHY device 202 may be an integrated device that comprises a multi-rate physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate interface 204a that may comprise suitable logic, circuitry, and/or code to enable communication with the PHY device 202 at a plurality of data rates via the interface 208.

The multi-rate physical layer block 212 in the PHY device 202 may comprise suitable logic, circuitry, and/or code that may enable operability and/or functionality of physical layer requirements. In this regard, the multi-rate physical layer block 212 may enable generating the appropriate link discovery signaling utilized for establishing communication with a remote PHY device in a remote link partner. In this regard, a 10base-T PHY device may transmit normal link pulses (NLPs) periodically. Similarly, during auto-negotiation, 100 Base-TX, 1000 Base-T, and 10 Gbase-T PHY devices, for example, may transmit fast link pulse (FLP) bursts, where each burst comprises a train of NLPs. The multi-rate physical layer block 212 may communicate with the MAC controller 204 via the interface 208. In one aspect of the invention, the interface 208 may be a media independent interface (MII) and may be configured to utilize a plurality of serial data lanes for receiving data from the multi-rate physical layer block 212 and/or for transmitting data to the multi-rate physical layer block 212, in order to achieve higher operational speeds such as 1 Gbps or 10 Gbps, for example. The multi-rate physical layer block 212 may be configured to operate in one or more of a plurality of communication modes, where each communication mode may implement a different communication protocol. These communication modes may include, but are not limited to, Ethernet over twisted pair standards 10 Base-T, 100 Base-TX, 100 Base-T, 10GBase-T, and other similar protocols that utilize multiple links between link partners. The multi-rate physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate physical layer block 212. The parameters may comprise configuration data and the code may comprise operational code such as software and/or firmware, but the information need not be limited in this regard. Moreover, the parameters may include adaptive filter and/or block coefficients for use by the multi-rate physical layer block 212, for example.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a link that may comprise the cable 112. In this manner, a transmitter/receiver pair may interface with each of the links 224a, 224b, 224c, 224d. In this regard, the transmitter/receiver pairs may be enabled to provide the appropriate communication rate and mode for each link.

The input/output interfaces 222 may comprise suitable logic circuitry, and/or code that may enable the PHY device 202 to impress signal information onto a physical medium comprising a link, for example a twisted pair link comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the link. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. For example, the PHY device 202 may be enabled to transmit and receive data at 1 Gbps, 10 Gbps or higher. In this manner, the PHY device 202 may be 1 GBASE-T and/or 10 GBASE-T compliant. Accordingly, the link partner 200 may comprise a number of hybrids 226 corresponding to the number of physical links. Each hybrid 226 may comprise suitable logic, circuitry, and/or code that may enable separating transmitted and received signals from a physical link. Each hybrid 226 in the local link partner 300 may be communicatively coupled to an input/output interface 222.

In an exemplary operation, the link partner 200 may communicate with a remote partner via the cable 112. For example, for 1 Gbps Ethernet, the link partner 200 may transmit data to and receive data from a remote partner via the links 224a, 224b, 224c, and 224d. In this regard, when there is no data for the link partner 200 to transmit, then it may transmit IDLE symbols to maintain synchronization with the remote link partner.

In operation, the link partner 200 may communicate with a remote partner via, for example, the cable 112. For example, the link partner 200 may transmit, for example, multimedia content to a remote partner via the link 224a and may receive control and/or auxiliary data associated with the multimedia content from the remote partner via the link 224b. In this regard, the link partner 200 may be enabled to utilize AVB for the transmission and/or reception of data over the links 224a and/or 224b. Additionally, the link partner may be enabled to transmit at a first data rate and receive at a second, possibly different, data rate. For example, the link partner 200 may transmit multimedia content via the link 224a at a data rate of 1 Gbps and may receive control data via the link 224b at a rate of 500 Mbps. In this manner, multimedia content may be transmitted utilizing a first, high(er), symbol rate and auxiliary and/or control data may be transmitted utilizing a second, low(er), symbol rate. Transmitting auxiliary and/or control data utilizing a low(er) symbol rate may result in power savings for the link partner 200 and/or a remote link partner with which the link partner 200 may communicate. Accordingly, power consumption, error rates, link utilization, and availability of resources (e.g. power, bandwidth, processor time, etc.) may be controlled via controlling a symbol rate at which the link partner 200 transmits.

Figure 3:
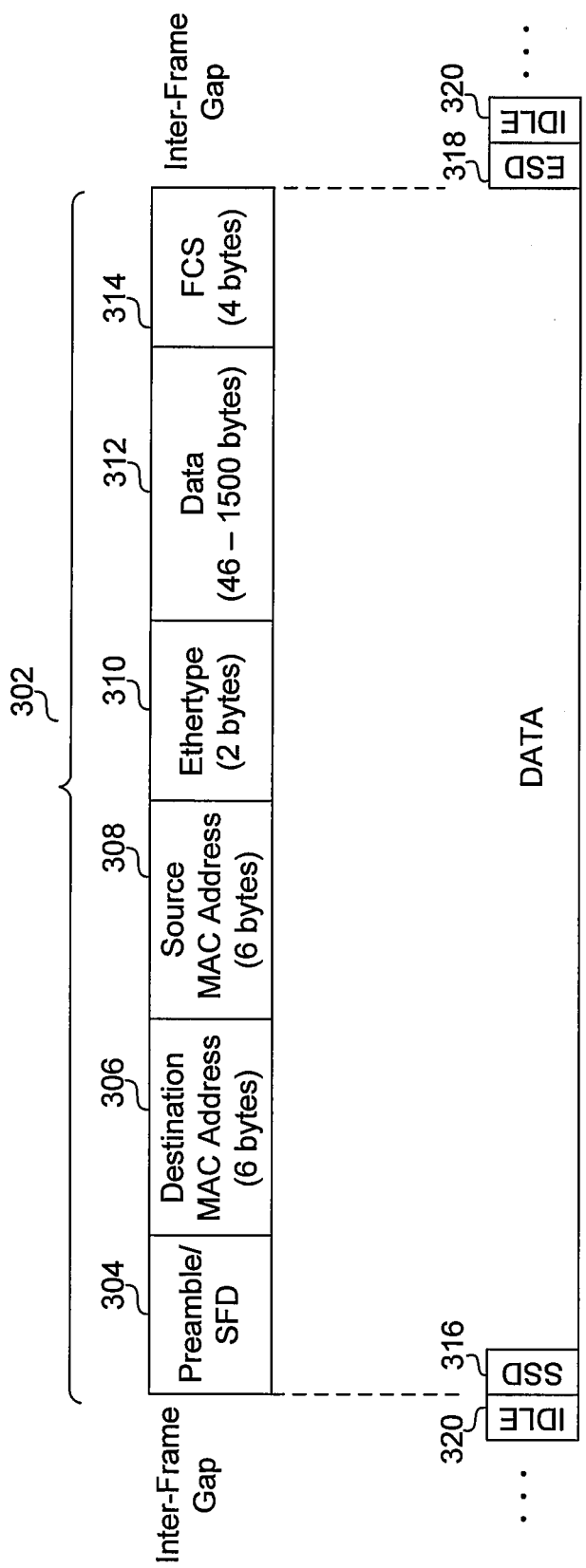
FIG. 3 is a diagram illustrating exemplary activity on an Ethernet link, in accordance with an embodiment of the invention.

FIG. 3 is a diagram illustrating exemplary activity on an Ethernet link, in accordance with an embodiment of the invention. Referring to FIG. 3, there is shown an exemplary Ethernet frame 302, preceded and followed by IDLE symbols 320.

The Ethernet frame 302 may comprise a preamble 304, destination MAC address field 306, a source MAC address field 308, an Ethertype field 310, a data field 312, and a frame check sequence (FCS) 314.

The first 62 bits of the preamble may be utilized to phase lock a receiving PHY device to a transmitting PHY device. The last 2 bits of the preamble, '11', may indicate the end of the preamble and that the next bit received may be real data. The final byte of the preamble (the last 8 bits ending in '11') is also known as a start of frame delimiter (SFD) 316. In various embodiments of the invention, the first 8 bits of the preamble may be replaced with a start of stream delimiter (SSD) 316 to indicate the end of an inter-frame gap and the beginning of a frame.

The destination MAC address field 306 may comprise information that may be utilized to identify the node that the frame is to be sent to. The source MAC address 308 field may comprise information that may be utilized to identify the node that originated the frame. The Ethertype field 310 may comprise information that may be utilized to identify the protocol (e.g. IPv4 or IPv6) being transported in the packet. The data field 312 may contain the data being transmitted. The FCS 314 may comprise information that may be utilized to provide error detection for the packet. In various instances, the frame 302 may be immediately followed by an end of sequence delimiter (ESD) 318 to indicate the end of a frame and the beginning of an inter-frame gap.

In operation, Ethernet frames may be transmitted utilizing a variable symbol rate. For example, when an amount of data stored in one or more buffers is below a threshold, aspects of the invention may enable reducing the symbol rate at which data may be transmitted. Similarly, when an amount of data stored in one or more buffers is above a threshold, for example, aspects of the invention may enable increasing the symbol rate at which data may be transmitted.

Figure 4:
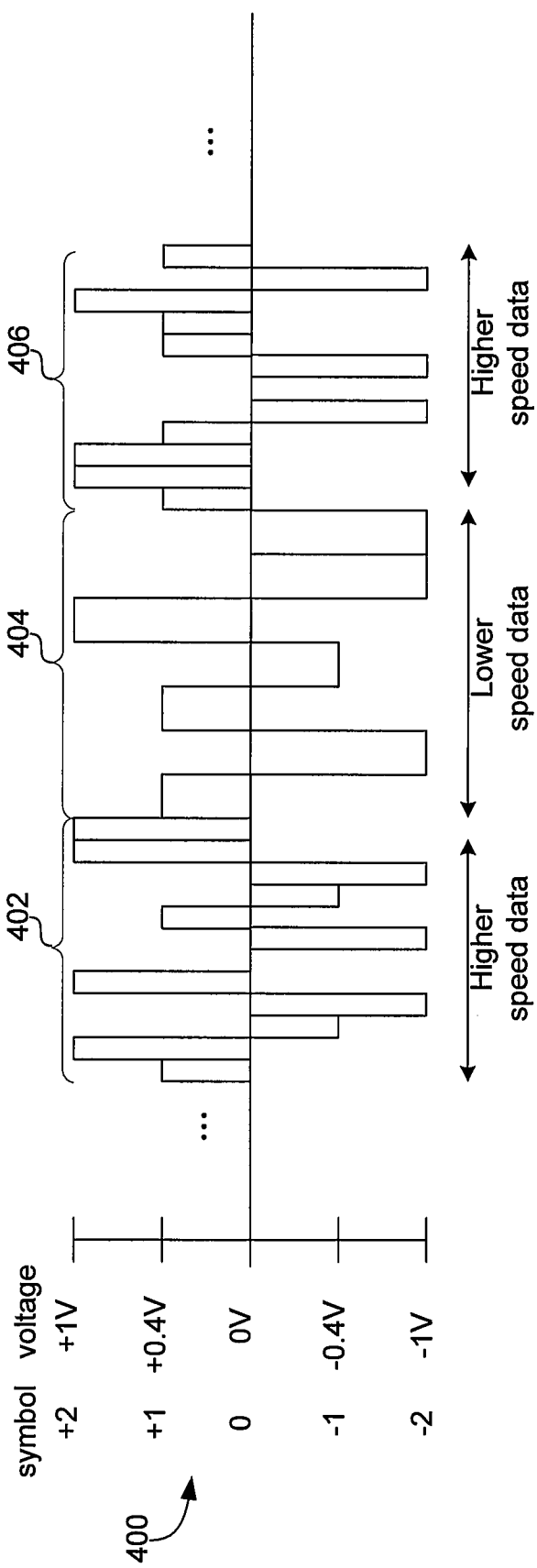
FIG. 4 is a block diagram illustrating transmission of signals at a reduced symbol rate, in accordance with an embodiment of the invention.

FIG. 4 is a block diagram illustrating transmission of signals utilizing a reduced a symbol rate, in accordance with an embodiment of the invention. Referring to FIG. 4 there is shown a data stream 400 comprising three intervals of data transmission 402, 404, and 406. The data stream 400 may be transmitted by a link partner such as the link partners 102 or 104 of FIG. 1. In this regard, each of the intervals of data 402, 404, and 406 may comprise one or more Ethernet frames.

In 1 Gbps Ethernet, for example, data may conventionally be transmitted at 125 Msps over each of four lanes or links. In accordance with an embodiment of the invention, the symbol rate may, for example, be reduced to 12.5 Msps for a data rate of 100 Mbps. In this exemplary instance, aspects of the invention may enable reducing power consumption whenever a 100 Msps data rate is sufficient to, for example prevent dropped packets. In various embodiments of the invention, the symbol rate may be reduced by any suitable rate to, for example, reduce power consumption, reduce error rates, and/or free up resources while still transmitting at a data rate sufficient for current network utilization. Moreover, in various embodiments of the invention, a transceiver may select from two or more symbol rates depending on past, present, and/or anticipated future utilization of one or more network resources. In this regard, exemplary network resources may comprise bandwidth, processor time, and data buffers.

In the exemplary operation depicted in FIG. 4, during periods of high link utilization, such as intervals 402 and 406, data may be transmitted at a high(er) data rate. In this regard, the high(er) data rate may be necessary during intervals 402 and/or 406 so as to prevent dropped packets or excessive buffer size, for example. Accordingly, during periods of low link utilization, such as the interval 404, data may be transmitted at a reduced symbol rate. In this manner, aspects of the invention may be enabled to determine, for example, required data rates, error rates, and/or available resources; and adjust a symbol rate accordingly. For example, a link partner, such as the link partner 200 of FIG. 2 may be enabled to adjust a symbol rate to optimize power consumption vs. buffer size, for example.

Figure 5:
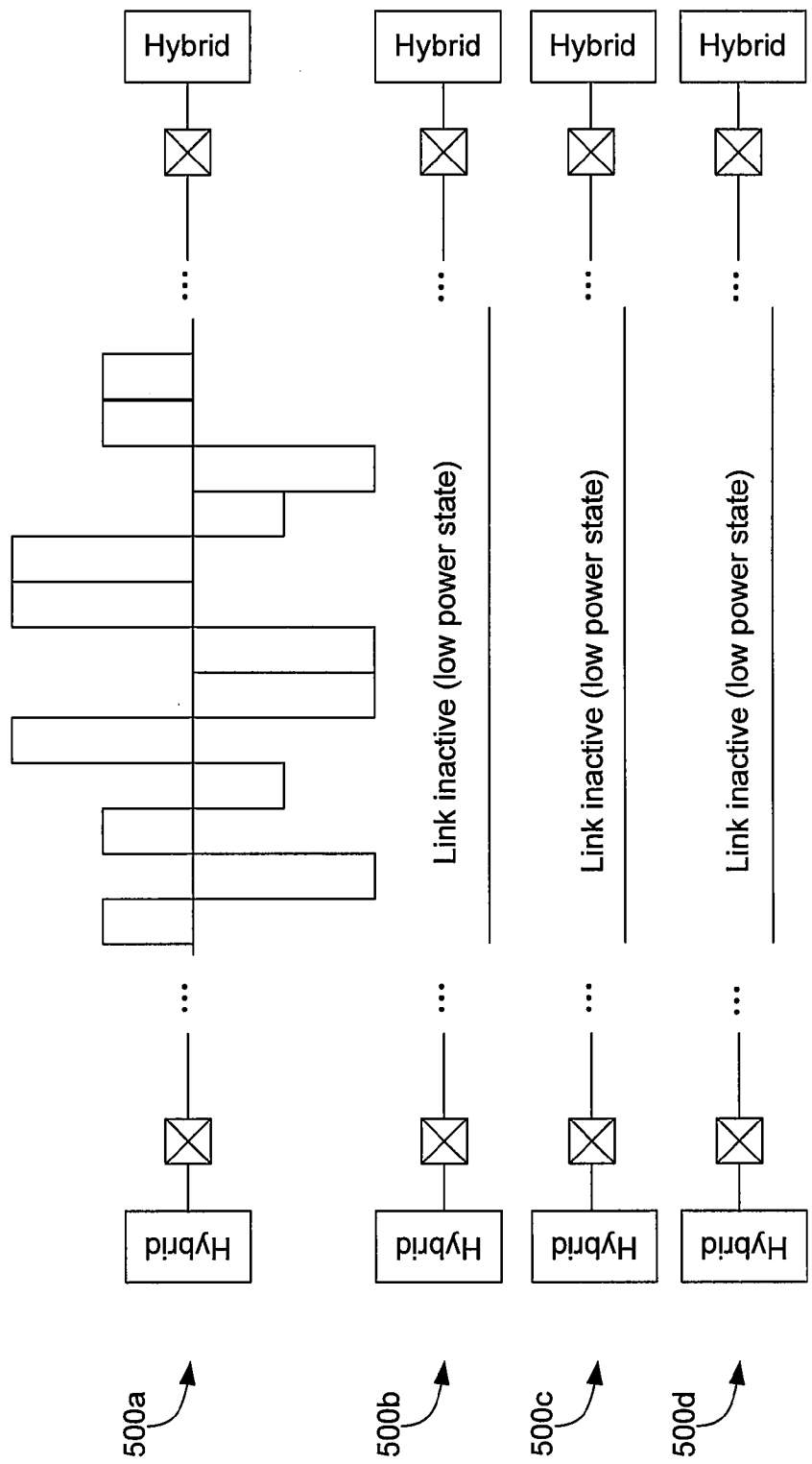
FIG. 5 is a diagram illustrating an exemplary system enabled for reduced power consumption during periods of low link utilization, in accordance with an embodiment of the invention.

FIG. 5 is a diagram illustrating an exemplary system enabled for reduced power consumption during periods of low link utilization, in accordance with an embodiment of the invention. Referring to FIG. 5 there is shown four physical links 500a, 500b, 500c, and 500d which may exist, for example, between two link partners such as the link partner 200 of FIG. 2.

In operation, 1 Gbps Ethernet for example, may transmit at 125 Msps (125000 symbols per second), with each symbol representing 2 bits of data. Accordingly, 4 links result in a data rate of 1 Gbps. However, in accordance with an embodiment of the invention, by transmitting at 12.5 Msps, the data rate may be reduced from 1 Gbps to 100 Mbps. Additionally, as depicted in FIG. 5, further power savings may be realized by reducing one or more links to a low(er) power or reduced activity state. For example, in the 1 Gbps system depicted, the data rate may be reduced to 250 Mbps by disabling or putting into a low(er) power state, 3 of the 4 links 500a, 500b, 500c, 500d. Moreover, in an exemplary embodiment of the invention, a reduction in the number of transmitting links combined with a reduced symbol rate to 12.5 Msps may reduce the data rate to 25 Mbps. In various embodiments of the invention, links put into a low power state may transmit signals to maintain link status. In this regard, synchronization functions, equalization, automatic gain control, adaptive echo cancellation, or other signal processing operations may be maintained during low(er) power periods transmission so that a link partner may quickly transition between different data rates. Although an example of reducing 1 Gbps to 25 Mbps is provided, other symbol rates and/or number of links may be utilized without deviating from the scope of the invention. For another example, a 10 Gbps Ethernet network may transmit on only a single link with a symbol rate approximately 2.5 times slower than the conventional 833 Msps to provide a data rate of 1 Gbps.

Figure 6:
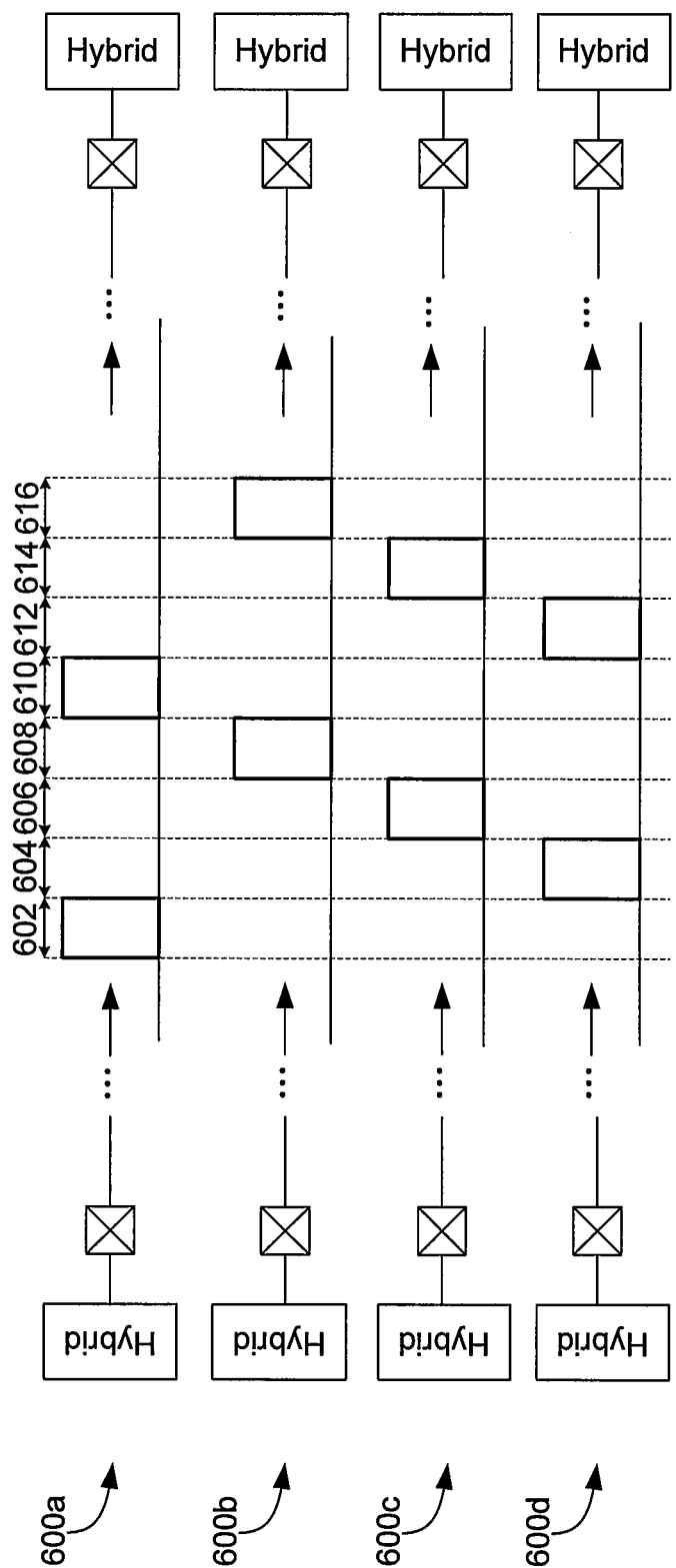
FIG. 6 is a diagram illustrating alternating links being placed in a low(er) power state, in accordance with an embodiment of the invention.

FIG. 6 is a diagram illustrating alternating links placed into a low(er) power state, in accordance with an embodiment of the invention. Referring to FIG. 6 there is activity on four links 600a, 600b, 600c, 600d during intervals 602 to 616.

In operation, as discussed above, one or more links comprising a cable, such as the cable 112 for example, may be disabled during periods of low(er) activity. In the exemplary embodiment depicted, 3 of the 4 links 600a, 600b, 600c, 600d may be disabled or reduced to a low(er) power state and actual data may be transmitted on a reduced number of links during a time interval. For example, data may be transmitted on the link 600b during the interval 616, the link 600c during the interval 614, the link 600d during the time interval 612, and so forth. In this manner, the length of the intervals 602-616 may be chosen such that a minimum period of inactivity for each of the links 600a, 600b, 600c, and 600d is maintained at less than a determined amount of time. In this manner, the length of the intervals 602 to 616 may be chosen such that each of the links 600a, 600b, 600c, and 600d is able to maintain synchronization and/or other parameters necessary for the rapid transition to a higher data rate.

Figure 7:
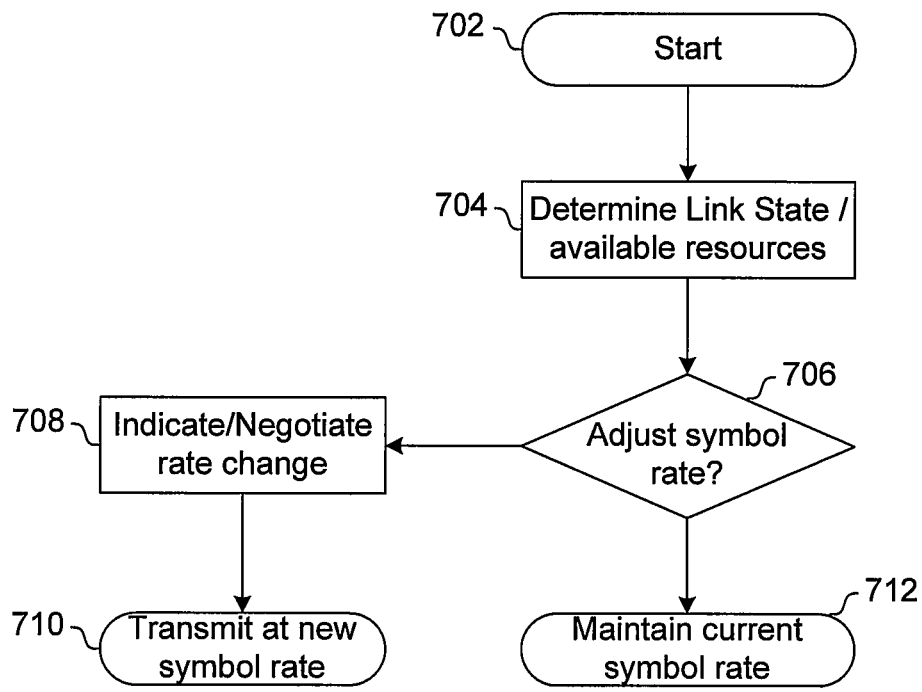
FIG. 7 is a flow chart illustrating exemplary steps for varying a symbol rate in an Ethernet network, in accordance with an embodiment of the invention.

FIG. 7 is a flow chart illustrating exemplary step varying a symbol rate in an Ethernet network, in accordance with an embodiment of the invention. Referring to FIG. 7 the exemplary steps may begin with a start step 702. Subsequent to step 702, the exemplary steps may advance to step 704. In step 704, the state of one or more network links and the availability of resources in the network may be determined. In this regard, link state may comprise, for example, bit error rate, packet error rate, and link utilization; and resources may comprise, for example, power, buffers, and processor time. Subsequent to step 704 the exemplary steps may advance to step 706. In step 706 it may be determined whether to alter symbol rate in response to the determined link state and or status of network resources. Accordingly, if the link state and/or resource availability is outside of a determined range, a new symbol rate may be determined based on the link status and/or condition of network resources and the exemplary steps may advance to step 708. In step 708, the new symbol rate may be indicated to other nodes coupled to the link via one or more transmitted symbols. In various embodiments of the invention, the new rate may be determined by a single or "master" node or may be negotiated between multiple nodes coupled to the link. Subsequent to step 708, the exemplary steps may advance to step 710. In step 710, transmission of data at the symbol rate determined in step 706 may begin.

Returning to step 706, if the link status and/or resources are within a determined range, or if a symbol rate change is determined to be unnecessary or not possible, then the exemplary steps may advance to step 712. In step 712, transmission of data may continue at an unchanged or default symbol rate.

Aspects of a method and system for reducing transceiver power via a variable symbol rate are provided. In this regard, an Ethernet transmitter, such as the PHY device 202, may be enabled to transmit data at a variable symbol rate, wherein the symbol rate is determined based on a state of a link coupled to said Ethernet transmitter and/or resources available to said Ethernet transmitter. In this regard, link state may comprise one or more of, for example, available bandwidth, bit error rate, packet error rate, and link utilization; and resources may comprise one or more of, for example, power, buffer space, and processor time. Accordingly one or more thresholds for link state and/or resources may be determined and the symbol rate may be adjusted when those thresholds are exceeded. Aspects of the invention may enable defining and/or transmitting unique symbols to identify possible symbol rates and/or a change in symbol rate.

Another embodiment of the invention may provide a machine-readable storage, having stored thereon, a computer program having at least one code section executable by a machine, thereby causing the machine to perform the steps as described herein for reducing transceiver power via a variable symbol rate.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
performing by one or more circuits and/or processors of an Ethernet PHY:
transmitting Ethernet physical layer symbols onto an Ethernet link comprising twisted pair cabling at a symbol rate having a first non-zero value;
determining an amount of data to be transmitted, said data being stored in one or more buffers of said Ethernet PHY;
adjusting said symbol rate to a second non-zero value when said amount of data falls below a first threshold, said second non-zero value being different than said first non-zero value;
wherein said second non-zero value for said symbol rate is determined based on bandwidth available on said Ethernet link and resources available to said Ethernet PHY, said resources comprising power.

2. The method according to claim 1, comprising, prior to transmitting one of a plurality of unique symbols, transmitting one or more symbols that indicate a change in said symbol rate.

3. The method according to claim 2, comprising transmitting one or more of said symbols during an inter-packet gap on said Ethernet link.

4. The method according to claim 1, comprising reducing said symbol rate to said second non-zero value when:
error rates associated with said Ethernet physical layer symbols are above a threshold;
utilization of said Ethernet link is above a threshold; and/or
resources available to said Ethernet PHY are below a threshold.

5. The method according to claim 1, comprising increasing said symbol rate when:
error rates associated with said Ethernet physical layer symbols are below a threshold;
utilization of said Ethernet link is below a threshold; and/or
resources available to said Ethernet PHY are above a threshold.

6. The method according to claim 1, comprising determining said second non-zero value for said symbol rate based on utilization of said Ethernet link.

7. The method according to claim 1, comprising determining said second non-zero value for said symbol rate based on a state of said Ethernet link, wherein said state of said Ethernet link comprises one or more of: a bit error rate, a packet error rate, and a utilization of said Ethernet link.

8. A non-transitory machine-readable storage having stored thereon, a computer program having at least one code section, the at least one code section being executable by a machine comprising an Ethernet PHY for causing the machine to perform steps comprising:
transmitting Ethernet physical layer symbols onto an Ethernet link comprising twisted pair cabling at a symbol rate having a first non-zero value;
determining an amount of data to be transmitted, said data being stored in one or more buffers of said Ethernet PHY;
adjusting said symbol rate to a second non-zero value when said amount of data is below a first threshold, said second non-zero value being different than said first non-zero value;
wherein said second non-zero value for said symbol rate is determined based on bandwidth available on said Ethernet link and resources available to said Ethernet PHY, said resources comprising power.

9. The non-transitory machine-readable storage according to claim 8, wherein said at least one code section comprises code for, prior to transmitting one of a plurality of unique symbols, transmitting one or more symbols that indicate a change in said symbol rate.

10. The non-transitory machine-readable storage according to claim 9, wherein said at least one code section comprises code for transmitting one or more of said symbols during an inter-packet gap on said Ethernet link.

11. The non-transitory machine-readable storage according to claim 8, wherein said at least one code section comprises code for reducing said symbol rate to said second non-zero value when:
error rates associated with said Ethernet physical layer symbols are above a threshold;
utilization of said Ethernet link is above a threshold; and/or
resources available to said Ethernet PHY are below a threshold.

12. The non-transitory machine-readable storage according to claim 8, wherein said at least one code section comprises code for increasing said symbol rate when:
error rates associated with said Ethernet physical layer symbols are below a threshold;
utilization of said Ethernet link is below a threshold; and/or
resources available to said Ethernet PHY are above a threshold.

13. The non-transitory machine-readable storage according to claim 8, wherein said at least one code section comprises code for determining said second non-zero value value for said symbol rate based on utilization of said Ethernet link.

14. The non-transitory machine-readable storage according to claim 8, wherein said at least one code section comprises code for determining said second non-zero value for said symbol rate based on a state of said Ethernet link and said state of said Ethernet link comprises one or more of a bit error rate, a packet error rate, and a utilization of said Ethernet link.

15. A system, comprising:
one or more circuits and/or processors of an Ethernet PHY, said one or more circuits and/or processors being operable to:
transmit Ethernet physical layer symbols onto an Ethernet link comprising twisted pair cabling at a symbol rate having a first non-zero value;
determine an amount of data to be transmitted, said data being stored in one or more buffers of said Ethernet PHY;
adjust said symbol rate to a second non-zero value when said amount of data is below a first threshold, said second non-zero value being different than said first non-zero value;
wherein said second non-zero value for said symbol rate is determined based on bandwidth available on said Ethernet link and resources available to said Ethernet PHY, said resources comprising power.

16. The system according to claim 15, wherein said one or more circuits and/or processors are operable to, prior to transmitting one of a plurality of unique symbols, transmit one or more symbols that indicate a change in said symbol rate.

17. The system according to claim 16, wherein said one or more circuits and/or processors are operable to transmit one or more of said symbols during an inter-packet gap on said Ethernet link.

18. The system according to claim 15, wherein said one or more circuits and/or processors are operable to reduce said symbol rate to said second non-zero value when:
- error rates associated with said Ethernet physical layer symbols are above a threshold;
- utilization of said Ethernet link is above a threshold; and/or
- resources available to said Ethernet PHY are below a threshold.

19. The system according to claim 15, wherein said one or more circuits and/or processors are operable to increase said symbol rate when:
- error rates associated with said Ethernet physical layer symbols are below a threshold;
- utilization of said Ethernet link is below a threshold; and/or
- resources available to said Ethernet PHY are above a threshold.

20. The system according to claim 15, wherein said one or more circuits and/or processors enable determining said second non-zero value for said symbol rate based on utilization of said Ethernet link.

21. The system according to claim 15, wherein said one or more circuits and/or processors are operable to determine said second non-zero value for said symbol rate based on a state of said Ethernet link and said state of said Ethernet link comprises one or more of a bit error rate, a packet error rate, and a utilization of said Ethernet link.

* * * * *